Patented Oct. 15, 1935

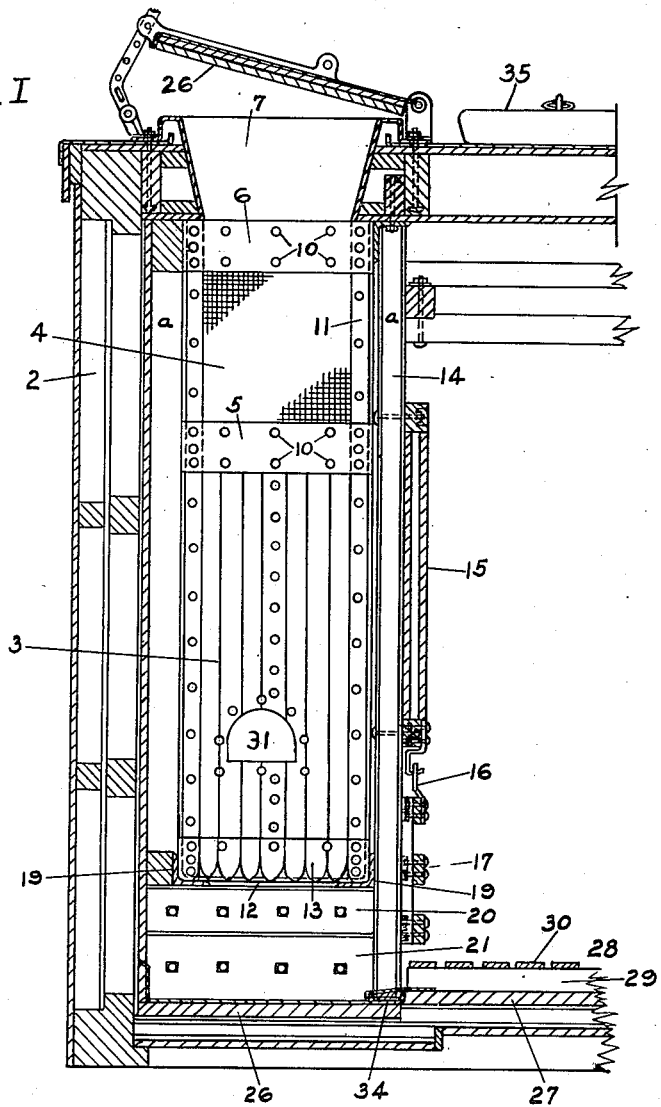
Fig. I

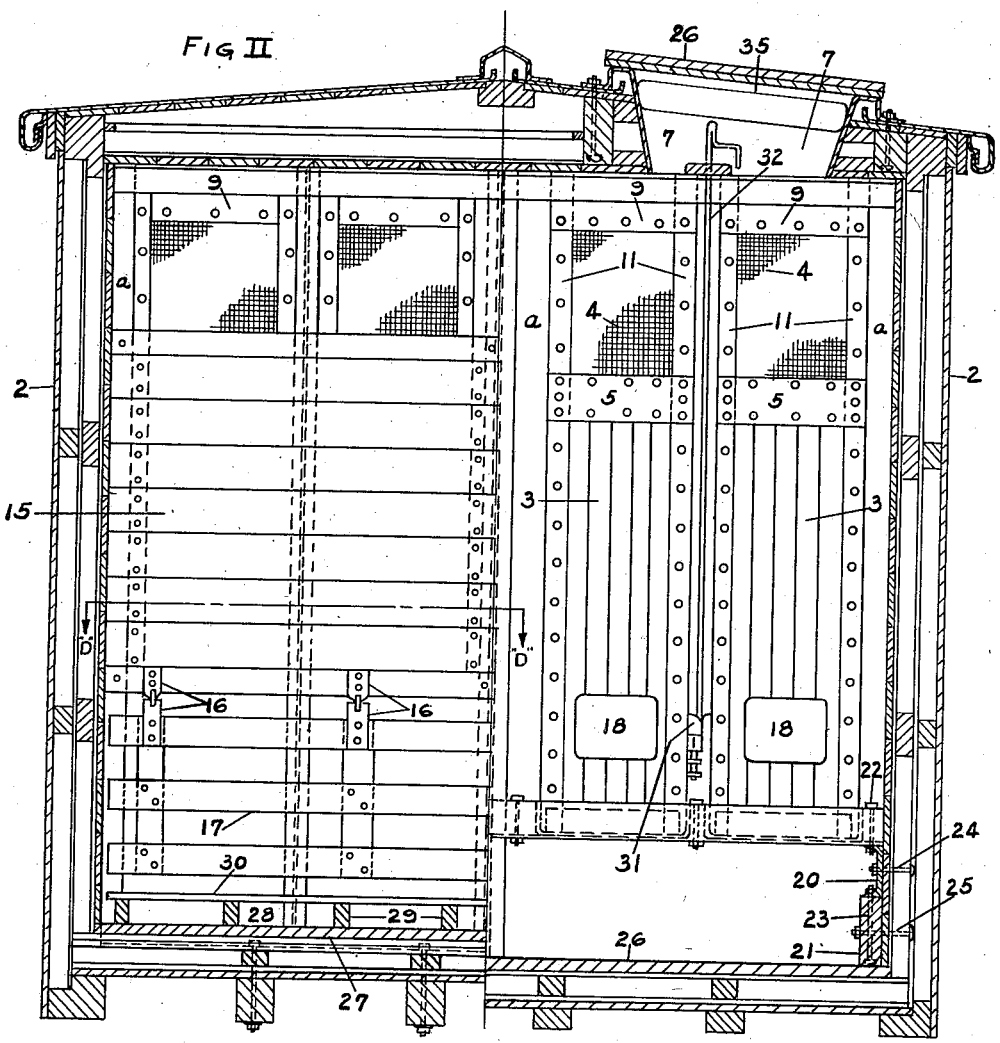
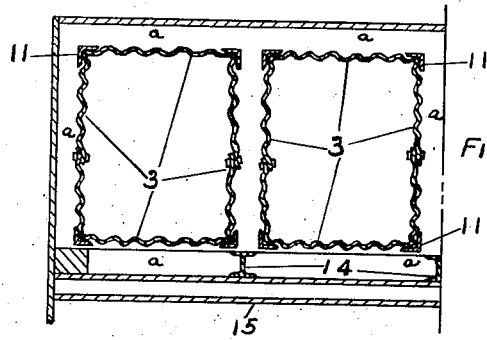
Fig. II
Fig. VII
Section "D-D"

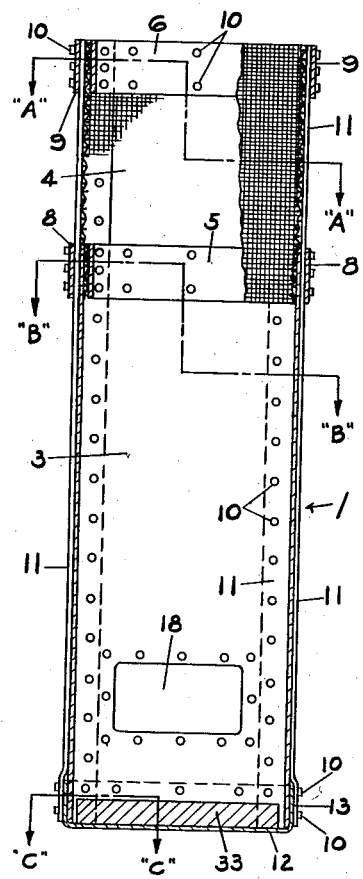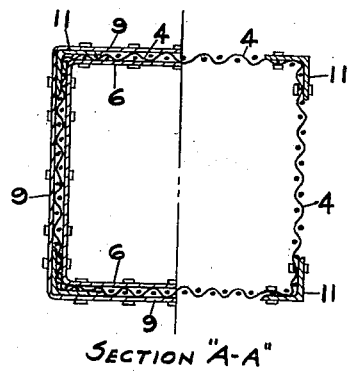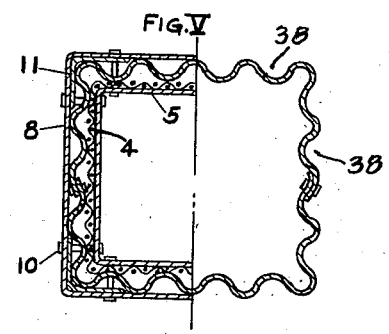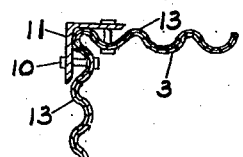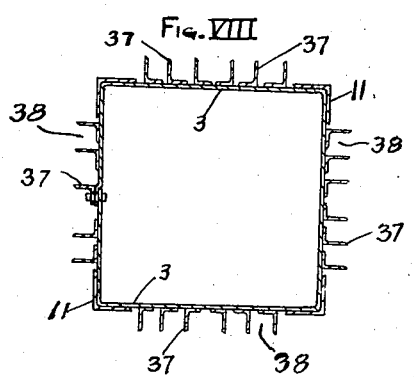

2,017,172

UNITED STATES PATENT OFFICE 2,017,172

REFRIGERATING STRUCTURE

Edward A. Sweeley, Alexandria, Va., and Norman T. Anderson, Washington, D. C.

Application February 19, 1932, Serial No. 594,064

2 Claims. (Cl. 62—19)

Our invention relates in general to car refrigeration, and more particularly to the type wherein the air is lowered in temperature, or refrigerated by use of an ice and salt brine solution or concentrate and also by air brought into direct contact with ice. Refrigerator cars of the brine concentrate type are employed ordinarily for shipment of meats and dairy products, and in which ventilation of the car is not a vital factor, and in such cars the temperature is lowered by the extraction of heat and condensation of moisture in air coming into contact with the external surface of the walls of the tank, which contains the ice and the brine concentrate, so that the extraction of heat from the air cools the air to a degree sufficient for preservation of meat and dairy products in transit.

For transportation of fruits and vegetables a refrigerator car of the type known as a "basket bunker" is generally employed, wherein ice is contained in a basket or bunker and air brought into direct contact with the ice in the basket, with the result that a lower temperature is obtained and in a much shorter period of time than is obtainabale by the brine concentrate method. In cars for transport of fruit and vegetables circulation of air in the car is promoted by ventilating features of construction embodied in such cars and not necessary in cars of the type used for meat and dairy products transportation.

An object of the present invention is to combine the brine concentrate method and the ice basket or bunker method in a car so that the presence of one will exert such a modifying influence on the other that by combining the two methods a refrigerating condition is produced suitable for meat and dairy products as well as for fruit and vegetable commodities.

To the accomplishment of the foregoing and such other objects as may hereinafter appear, the invention consists in the features hereinafter particularly described and then sought to be clearly defined by the claims, reference being had to the accompanying drawings forming a part hereof, and in which:

Figure I is a side elevation, partly in section, taken longitudinally through a car and showing one of the combined brine and ice tanks;

Figure II a front elevation, taken transversely through a car, showing at the left two of the tanks, side by side, at the rear of the bulk-head separating the load compartment from the tank compartment, and two at the right with bulk-head omitted;

Figure III a front elevation of one of the combined brine and ice tanks;

Figure IV a cross section on line A—A of Figure III;

Figure V a cross-section on line B—B of Figure III;

Figure VI a horizontal section through one corner of the tank, with some parts omitted, on line C—C of Figure III;

Figure VII is a cross-section on line D—D of Figure II;

Figure VIII is a modified form of the combined ice and brine tank.

In the accompanying drawings the numeral 1 designates a combined ice and brine tank which will contain the refrigerant for lowering the temperature in a commodity receiving compartment, which in the illustration selected may be a refrigerator car, a portion of the body of such a car being designated by the numeral 2. The combined ice and brine tank comprises an imperforate lower wall portion 3, designed to receive and hold the brine or cooling liquid-concentrate, and a screen or reticulated upper wall portion 4 designed to receive ice, or a mixture of ice and salt to form a freezing or cooling concentrate for cooling the air in the commodity or loading chamber of the car. By forming the upper portion of the tank with screen or reticulated walls, air from the commodity or loading chamber is brought into direct contact with the ice in the tank and passes through the pieces of ice in the tank thereby giving the advantage of greater cold or lower temperature recognized as the result of bringing air in direct contact with ice instead of depending on extracting heat and moisture from air coming in contact with the outside of the walls of the brine tank, and also possessing the advantage of not having the tank walls covered with an external thickness of frost coating on the walls which has the effect of insulating the walls and preventing the air that is to be cooled from coming in direct contact with the walls of the tank free from an insulation on the outer surface. Another advantage arising from the combined ice and brine tank is that the freezing mixture composed of the salt and melting ice to form the concentrate may be retained in the tank between ice replenishing stations so that the discharge of the liquid concentrate from the brine tank may be at fixed points or stations as required to be by railroads. Thus advantages due to extraction of heat and condensation of moisture from air coming in direct contct with the outer surface of the walls of a tank containing a brine concentrate without the disadvantages mentioned, and the advantages derived from bringing moving air into direct contact with the ice and salt contained in a chamber having a screen or reticulated upper wall and passing the air thus cooled through ice in a lower chamber having imperforate walls and in contact with the brine contained in such chamber a materially lower temperature is obtainable, and it is made possible to utilize the most effective features of the air direct contact with ice method and the brine concentrate method, the characteristics of both methods exerting a modifying influence one on the other.

The walls of the imperforate portion of the brine tank are corrugated or formed with depressions 38 disposed either circumferentially or vertically, preferably vertically, as illustrated so as to increase the heat absorbing surface area of the walls. At points where the reticulated portion joins and laps over the imperforate portion, and also at the top of the tank, we place metallic bands or strips 5 and 6, respectively, on the inside of the tank, and bands or strips 8 and 9 may be applied to the outside, which bands or strips shield and protect the reticulated portion from damage by the ice introduced through the hatchway 7, and the similar bands or strips 8 and 9 applied to the outside of the tank serve as reinforcing backings. These bands or strips are secured by tinners' rivets 10, or otherwise, and they serve also to reinforce the upper and lower boundaries of the screen or reticulated walls. The corners of the brine tank are protected and braced by angle plates 11 which may terminate substantially at the lower edge of the screen or reticulated wall, or extend the whole length of the tank as shown, the angle plates being connected by rivets, or otherwise, to the body portion of the tank. The tank has a closed bottom formed preferably of a flat plate 12 having an upstanding rim 13, which preferably is formed with corrugations to receive the corrugations of the lower end of the tank wall as illustrated in Figure VI the bottom being secured to the tank wall by rivets similar to the other tinners' rivets 10.

Ordinarily four of these brine and ice tanks are installed at each end of a car in a space partitioned from the commodity or loading compartment of the car, four tanks being illustrated in Figure II of the drawings. This space is formed by the side walls and an end wall of the car and by a desired number of upright posts 14, preferably I-beam type, spaced apart and suitably supported upon the channel-bar 34. A bulk-head 15 of any desired suitable construction is placed at one side of the posts and of such height that there will be a space at top and bottom for communication between the loading compartment and the space or compartment containing the tanks, at the top and also at the bottom of the bulk-head. From the lower end of the bulk-head there is suspended, say by suitable hangers 16, a slatted gate 17 adapted to be swung open to permit access to clean-out-openings 18 in the tank walls for cleaning out the tanks when needed.

Each tank is supported in the compartment or bunker provided for it on angle bars 19 extending crosswise of the car, from side to side, their ends resting on channel bars 20 supported on longitudinally extending beams or bars 21 and secured in place by suitable means for instance by bolts 22, 23, 24 and 25 as shown in Figure II of the drawings, the supporting and securing means being substantially the same at both sides of the car, but shown at only one side. Any other suitable means than that shown may be employed for supporting the tanks in the bunker or compartment, without departing from the invention.

The tanks are so positioned in their bunker or compartment that there will be an air space $a$ between the tank wall and bulk-head, and the sides and end of the car so that air entering from the load compartment through the opening at the upper end of the bulk-head will pass through the screen or reticulated portion of the tank into the tank and in direct contact with the ice and down into the ice and salt, and the brine concentrate, in the imperforate portion of the tank, and what air passes transversely through the screen upper portion of the tank in direct contact with the ice therein and thence through the screen or reticulated sides of the tank, will travel down the air spaces between the walls of the tank and bulkhead and sides of the car and discharge into the space beneath the bottom of the tank and from thence through the slatted gate at the lower end of the bulk-head into the loading or commodity compartment and up through the commodities and thence back into the bunker containing the combined brine and ice tank, the movement of the air in the path described being in successive cycles during the air cooling operation.

The floor 26 of the ice and brine tank bunker compartment is below the level of the fixed floor 27 of the loading compartment, and upon the floor 27 rests a supplemental floor 28 comprising longitudinally extending spaced apart stringers 29 across which extend spaced apart slats 30. Some of the air from the space beneath the ice and brine tank passes beneath the supplemental floor of the loading compartment and up between the slats thereof and in contact with the commodities therein together with the air which enters through the opening beneath the bulk-head. Each tank is provided in one side with a valve controlled opening for discharge of the brine, in whole or in part, at stations located along the right of way of the railroad so as to comply with regulations of many if not all railways operating throughout the country. In Figure II of the drawings we illustrate in conventional or diagrammatic way such a valve located at 31 and operated through a valve-rod 32 which may be accessible through the hatchway 7, or other suitable point. In the illustration given this valve controls the discharge from two tanks, the details of the valve not being shown because it may be any well-known and approved type of valve in use for the purpose.

To protect the bottom of the combined ice and brine tank against damage from ice, a block 33 of wood or other material is laid on the bottom plate 12 of the tank and the block serves as a cushion to receive impact of ice in being supplied to the tank or from movements of the ice arising from vibrations in travel of the cars over the rails of the right of way.

We have illustrated and described the features with sufficient fullness for a clear understanding of the invention by persons skilled in this art but it is to be understood that changes may be made in the details without departing from the scope of the invention as sought to be clearly defined by the claims. Some elements embodied in the general construction of the car are shown but no detailed description thereof given because they are not essential to an embodiment of the invention made or to a clear understanding thereof.

In a résumé of the invention, it is to be observed that the combined ice and brine tank feature makes possible the advantages of a lower temperature imparted to the air, in a shorter period of time, obtainable from direct contact of air to be cooled with ice and salt in the screen or reticulated upper portion of the tank, and also with the brine concentrate collected in the lower imperforate portion of the tank, and further that the lower temperature thus produced is maintained to a greater or less degree and modified to some extent by extraction of heat and condensation of moisture from the air outside of the tank, contacting with the chilled wall of the tank, with the result that one method of cooling the air is modified by the presence of the other method so that the refrigerated air delivered to the loading compartment of the car, produces in the loading compartment a temperature or atmosphere different from what would be produced by the use of either of the two cooling methods without the presence of the other, and thus is made possible the production and maintenance of a temperature suitable for transportation of either meats and dairy products, or fruits and vegetables without deterioration in either class of commodities.

Another advantage obtained is that the air cooled by direct contact with the ice and salt, or salt concentrate, within the tank, passes from within the tank to the chamber of the bunker around the combined ice and brine tank and traverses the channels formed in the outer surface of the tank wall and the difference in temperature between the air cooled by direct contact of air with the ice and salt mixture within the tank, and the temperature of the air outside of the tank effected by extraction of heat units from the air coming in contact with the external chilled walls of the tank, causes such modifying influence of one temperature on the other that the formation of a frost incrustation on the external surface of the ice and salt tank is prevented with the result that the outside air will come into more intimate contact with the external surface of the ice and brine tank, so that a greater number of heat units are extracted from the outside air. The effect is to provide a volume of refrigerated air suitable for transportation of meat and dairy products and also suitable for vegetables and fruits, without deterioration in either class of commodities, as has been demonstrated in actual practice.

It will be thus observed, that by combining the features of "direct air contact with ice" and the features of brine tank heat absorption and moisture condensation in air coming in contact with the outside wall of the brine tank, there is obtained such modifying influence of one method of cooling upon the other method as to give results not obtainable by use of either without the other.

For ventilation of the car in transportation of commodities not requiring a refrigerating temperature, ice and salt and the brine concentrate may be omitted from the tank, and the hatchway plug 35 and cover 26 lifted as indicated in Figure I, so that air from the outside may enter the car through the hatchway and pass through the ice and brine tank bunker and into the loading compartment and then back into the bunker compartment. If desired the ice and brine tank may be removed when the car is to be used as a ventilated car but the removal is not absolutely necessary.

Instead of forming the imperforate portion of the brine tank of corrugated metal as described, the tank as illustrated in Figure VIII may be provided externally with ribs or fins 37 formed integrally with the body portion or made separately and attached to the body portion by rivets or by welding, or otherwise, as most desirable. These fins or ribs increase the heat absorbing surface of the tank, and the spaces 38 between the ribs or fins correspond practically to the inwardly depressed portions of the corrugations and form walled passage-ways for flow of cold air along an enlarged heat absorbing surface from top to bottom of the tank and between the bunker walls and the walls of the tank. The air traversing these passage-ways tends to equalize to a greater or less extent the temperature between the interior and exterior of the brine tank, and thus make less liable the formation of a relatively heavy or thick frost incrustation on the external surface of the tank which would have the effect of an insulation and detract from the most effective heat absorption for production of cold of the tank.

Instead of forming the tank with an imperforate metal portion and an upper portion of wire screen as illustrated in Figs. I to V of the drawings, it may be formed from bottom to top of a solid wall portion 3, and have openings of desired size cut in the sides or walls of its upper portion and the openings covered with wire screen 4 secured in any suitable manner to walls of the tank and have metal strips corresponding to the strips or bands 5 and 6 applied along the lower and upper edges of the openings and corresponding metal bands applied over the wire screen along the vertical edges of the openings, so as to brace and protect the wire screen substantially as described for the form illustrated in Figs. I to V of the drawings, thus providing a tank having imperforate walls for the lower portion and with reticulated walls for the upper portion for passage of air currents into and out of the tank as described for the other form of the tank.

By employing a combined ice and brine tank with an upper reticulated portion for an ice and salt mixture and a lower imperforate portion for a brine concentrate, having exterior channels for the flow of air currents along the imperforate wall, air will come in direct contact with ice in the reticulated portion of the tank and then flow along the air channels externally of the imperforate wall portion of the tank, the air cooled by direct contact with the ice and the air cooled by absorption of heat by the concentrate in the imperforate wall portion of the tank, mixing one with the other so that one will modify the other and produce an average temperature of air for circulation through the compartment containing the commodities under transportation, and give advantages traceable to both the direct contact of air with ice and air cooled by absorption of heat by contact of air with the imperforate wall cooled by the brine concentrate in the imperforate wall portion of the tank. The modified temperature thus produced is suitable for transportation of meat, and dairy products and also for fruit and vegetable products.

It will be observed that the combined brine and ice tank is a unit or unitary structure in which the ice, and the brine resulting from meltage of the ice, are retained in the tank by the imperforate wall portion of the tank until the brine is discharged, at will, from the tank by operation of a control valve. It will also be observed that air is brought in direct contact with the ice in the tank and then flows downwardly in the tank, and a portion passes transversely through the tank, from side to side, and then down the sides of the perforated and the imperforate wall portions, along with the air flowing downwardly through the spaces between the tank and walls of the bunker compartment. Under this construction the air which has been in direct contact with ice in the tank and that which comes in contact with only the outer surface of the tank, is so modified, one by the other, that a more equable temperature for refrigerating purposes is produced and better refrigerating effects obtained. The tank embodying in general the features described, furnishes a tank unit meeting the requirements of present day regulations concerning the use of ice and brine refrigerating mixtures, under which replenishing of ice and emptying of the brine from the tanks is contemplated to take place at icing stations along the route of railroads.

Having described the invention and set forth its merits what we claim is:—

1. A combined ice and brine tank unit for refrigerator structures, comprising an upper reticulated wall portion for an ice and salt mixture, and a lower imperforate wall portion for a brine concentrate, said upper reticulated portion having substantially the major part of its wall area possessing characteristics of a screen-like formation for the passage of air from all sides through said reticulated wall whereby maximum surface contact between air and ice is obtained and a lower air temperature produced, said lower portion presenting irregular outer surfaces of enlarged superficial area and being provided with means for controlling, at will, the discharge of brine concentrate; said elements in the relationship specified cooperating to produce two different temperatures, one by direct contact of air with ice and the other by a contact of air with outer surfaces of the lower portion of the said unit containing brine concentrate, each modifying the other, and lessening formation of ice incrustation on the wall and producing a more uniform and relatively lower temperature throughout the said refrigerator structure.

2. The structure of claim 1, in which the upper reticulated wall portion of the tank unit comprises a substantial part of the vertical height of the unit.

EDWARD A. SWEELEY.
NORMAN T. ANDERSON.